(12) United States Patent
Swierk et al.

(10) Patent No.: US 10,627,882 B2
(45) Date of Patent: Apr. 21, 2020

(54) SAFEGUARD AND RECOVERY OF INTERNET OF THINGS (IOT) DEVICES FROM POWER ANOMALIES

(71) Applicant: Dell Products, L.P., Round Rock, TX (US)

(72) Inventors: Todd Erick Swierk, Austin, TX (US); Mark Randall Hammons, Round Rock, TX (US); Tyler Ryan Cox, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 177 days.

(21) Appl. No.: 15/433,369

(22) Filed: Feb. 15, 2017

(65) Prior Publication Data
US 2018/0232031 A1    Aug. 16, 2018

(51) Int. Cl.
| | |
|---|---|
| *G06F 1/30* | (2006.01) |
| *H04L 29/08* | (2006.01) |
| *H04L 12/26* | (2006.01) |
| *G06F 9/4401* | (2018.01) |
| *H04L 12/24* | (2006.01) |

(52) U.S. Cl.
CPC ............ *G06F 1/305* (2013.01); *H04L 43/08* (2013.01); *H04L 67/12* (2013.01); *G06F 9/4401* (2013.01); *H04L 41/0213* (2013.01); *H04L 41/0806* (2013.01)

(58) Field of Classification Search
CPC . H04L 12/2803; H04L 43/08; H04L 41/0672; H04L 67/12; H04L 41/0816; H04L 67/125; G06F 1/305; G06F 1/266; G06F 9/4401; G06F 1/3287; G06F 9/4416; H04Q 2209/43
See application file for complete search history.

(56) References Cited

U.S. PATENT DOCUMENTS

| | | | |
|---|---|---|---|
| 9,594,721 B1 * | 3/2017 | Marr ................. | G06F 15/17306 |
| 2007/0028122 A1 * | 2/2007 | Chuang .................... | G06F 1/30 713/300 |

(Continued)

OTHER PUBLICATIONS

Moyer, Byron, "Asserting Machine Control in the IoT: Sending Commands Where Data Publishing Dominates", http://www.eejournal.com/archives/articles/20150810-control/, Published Aug. 10, 2015, 7 pages.

(Continued)

*Primary Examiner* — Jaweed A Abbaszadeh
*Assistant Examiner* — Brian J Corcoran
(74) *Attorney, Agent, or Firm* — Fogarty LLP

(57) ABSTRACT

Systems and methods for safeguarding and recovering Internet-of-Things (IoT) devices from power anomalies. In some embodiments, an Information Handling System (IHS) may include a processor and a memory coupled to the processor, the memory including program instructions stored thereon that, upon execution by the processor, cause the IHS to: detect an electrical power anomaly in an IoT network based, at least in part, upon a comparison between a current volatility of a data field and a volatility baseline for that data field, wherein the data field is part of a packet communicated between an IoT device and the IHS; and in response to the detection, manage the IoT network.

20 Claims, 4 Drawing Sheets

(56) References Cited

U.S. PATENT DOCUMENTS

| | | | |
|---|---|---|---|
| 2009/0281679 A1* | 11/2009 | Taft | G01D 4/004 700/297 |
| 2012/0192016 A1* | 7/2012 | Gotesdyner | H04L 12/6418 714/47.3 |
| 2013/0289927 A1* | 10/2013 | Smith | G06F 17/18 702/130 |
| 2014/0101424 A1* | 4/2014 | Krishnamurthy | G06F 9/4401 713/2 |
| 2015/0256433 A1 | 9/2015 | Sum et al. | |
| 2016/0020997 A1 | 1/2016 | Hui et al. | |
| 2016/0021013 A1 | 1/2016 | Vasseur et al. | |
| 2016/0072832 A1* | 3/2016 | Kim | G06F 21/552 726/23 |
| 2016/0195864 A1 | 7/2016 | Kim | |
| 2016/0209899 A1 | 7/2016 | Brantner et al. | |
| 2016/0285717 A1 | 9/2016 | Kim et al. | |
| 2016/0330825 A1* | 11/2016 | Recker | H05B 37/0272 |
| 2017/0076023 A1* | 3/2017 | Cormier | G06F 17/5009 |
| 2017/0102978 A1* | 4/2017 | Pallath | G06F 11/0709 |
| 2017/0160328 A1* | 6/2017 | Pal | G01R 31/088 |
| 2018/0076662 A1* | 3/2018 | Maheshwari | G05F 1/66 |
| 2018/0095135 A1* | 4/2018 | Kawasaki | G01R 31/361 |

OTHER PUBLICATIONS

"System Power Fusion by Freescale", PF Series FS, http://cache.freescale.com/files/analog/doc/fact_sheet/PFSeriesFS.pdf, 2012, 2 pages.

Balakrishnan, Anand, "Power Management for the Internet of Things: The Internet of Things is an amalgamation of two diverse but interconnected advancements", http://www.electronicproducts.com/Analog_Mixed_Signal_ICs/Power_Management/Power_management_for_the_Internet_of_Things.aspx, Jul. 7, 2014, 4 pages.

Folkens, Joe, "Building a Gateway to the Internet of Things", Texas Instruments, http://www.ti.com/lit/wp/spmy013/spmy013.pdf, 2014, 11 pages.

Mcginn, Daniel, "The Internet of Things Demands New Thinking about Power Protection for Mains and Brains", http://blog.schneider-electric.com/power-management-metering-monitoring-power-quality/2015/09/29/the-internet-of-things-demands-new-thinking-about-power-protection-for-mains-and-brains/, Sep. 29, 2015, 4 pages.

* cited by examiner

US 10,627,882 B2

SAFEGUARD AND RECOVERY OF INTERNET OF THINGS (IOT) DEVICES FROM POWER ANOMALIES

FIELD

The present disclosure generally relates to Information Handling Systems (IHSs), and, more particularly, to systems and methods for safeguarding and recovering Internet-of-Things (IoT) devices and networks from power anomalies.

BACKGROUND

A new revolution is gaining momentum—a surge of innovation that involves vast ecosystems of sensors, devices, and networks that can transmit and receive data. With an estimated number of connected "things" reaching over 25 billion by 2020, the "Internet-of-Things" (IoT) is widely regarded as the next technological frontier.

Existing IoT deployments range from single device implementations to massive cross-platform systems that include tens, hundreds, or sometimes thousands of heterogeneous devices. Tying it all together are different communication protocols that enable these various components to talk to each other.

Because IoT is still in its infancy, however, its underlying technologies remain fractured. Alliances and coalitions are being formed in hopes of someday unifying the IoT landscape. But, at the present time, there is still no central IoT standard or deployment oversight. Consumers and providers continue to face ever-increasing deployment, architecture, analytics, and security challenges.

SUMMARY

Embodiments of systems and methods for safeguarding and recovering Internet-of-Things (IoT) networks from power anomalies are described. In an illustrative, non-limiting embodiment, an Information Handling System (IHS) comprises one or more processors and a memory coupled to the one or more processors, the memory including program instructions stored thereon that, upon execution by the one or more processors, cause the IHS to: detect an electrical power anomaly in an Internet-of-Things (IoT) network based, at least in part, upon a comparison between a current volatility of a data field and a volatility baseline for that data field, wherein the data field is part of a packet communicated between an IoT device and the IHS; and in response to the detection, manage the IoT network.

In various embodiments, the electrical power anomaly may be selected from the group consisting of: power failure, power sag, power surge, under-voltage, over-voltage, electrical line noise, electromagnetic interference, frequency variation, switching transient, and harmonic distortion. Detecting the power anomaly may include forecasting the power anomaly in anticipation of the anomaly taking place. To manage the IoT network, the program instructions, upon execution, may cause the IHS to shut down one or more IoT devices based upon a priority value associated with the one or more IoT devices. The priority value may be based, at least in part, upon at least two of: an IoT device sensitivity to the electrical power anomaly, a physical location of the IoT device, or a role of the IoT device within the IoT network. To manage the IoT network, the program instructions, upon execution, may cause the IHS to instruct each of the one or more IoT devices to boot up in an order corresponding to the priority value. To manage the IoT network, the program instructions, upon execution, may cause the IHS to stop processing data received from one or more IoT devices. To manage the IoT network, the program instructions, upon execution, may cause the IHS to instruct the one or more IoT devices to reduce a data collection rate of one or more sensors. The one or more IoT devices may include the IoT device, and the IoT device may include a sensor that produces data included in the data field.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
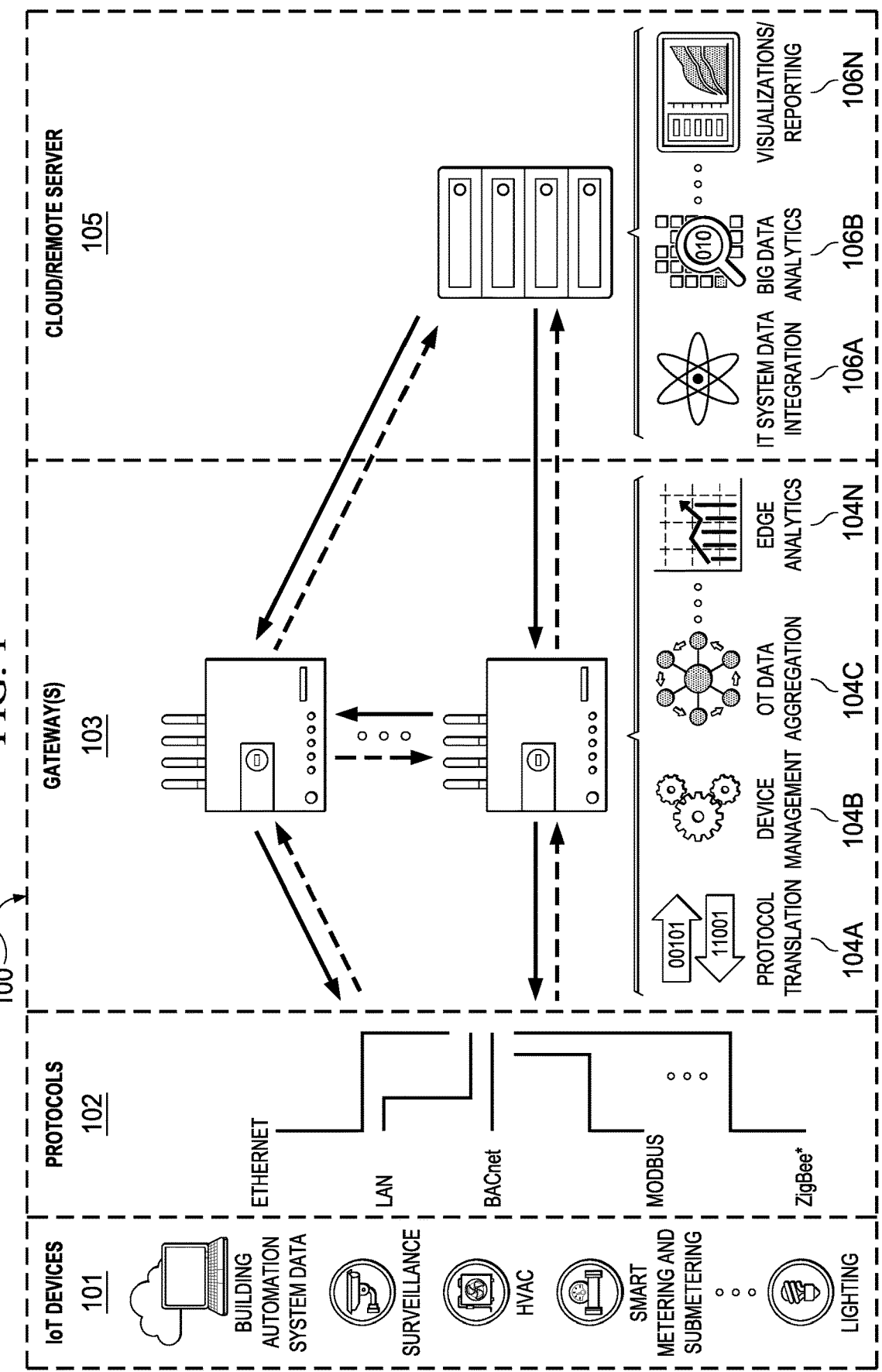
FIG. 1 illustrates an example of an Internet-of-Things (IoT) deployment according to some embodiments.

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

A. Overview

The Internet-of-Things (IoT) is an inter-networking of "things" or "objects" (generally referred to as "IoT devices") that promotes the collection and exchange of data among those objects. Generally speaking, IoT technology allows IoT devices to operate remotely across a network infrastructure to integrate the physical world into computer-based systems using a variety of different communication protocols. In the near future, it is expected that IoT will be used to automate nearly every field of human endeavor.

To name but a few examples, in the field of manufacturing, IoT may be used in process automation (chemicals, food, beverage, pharmaceuticals), discrete automation (auto, machine, electronics), and industrial equipment. In the field of transportation and logistics, IoT may be used in air, automotive, marine, or rail transport, fleet and freight management, cold chain logistics, traffic systems, public transit and travel, and usage insurance. In the energy field, IoT may be used in power generation and distribution, smart grids, oil and gas, and renewable energy. In communications, IoT may be used to support various information technology (IT) services, network services, data centers, and communication equipment. With respect to natural resources, IoT may be used in agriculture, metals and minerals mining, water and waste management, forestry, fishing, and livestock, and golf courses. In healthcare, IoT may be used in hospitals, home care, health care plans, medical laboratories, biotechnology, and medical appliances and equipment. And in retail and hospitality, IoT may be used in hotels, vending machines, amusement parks, restaurants, sports and entertainment, etc.

In several implementations, IoT systems may provide or support services ranging among: predictive maintenance, process or quality control, fleet management, supply chain and inventory management, smart infrastructure, building optimization, remote asset management, secure and access control, point-of-sale support, energy management, compliance, safety, and documentation, among many others.

Yet the quintessential example of IoT remains home automation. Modern home automation deployments (also known as "smart" or "intelligent" homes) can include control and automation of lighting, heating, ventilation, air conditioning (HVAC) systems, and appliances such as washer/dryers, robotic vacuums, air purifiers, ovens or refrigerators/freezers that use wired or wireless networking for remote monitoring and control.

The expansion of IoT into a plethora of new application areas is expected to generate incredibly large amounts of data from diverse, heterogeneous devices and locations. Nonetheless, there are currently no central standards in this field. Consequently, IoT consumers and providers continue to face many deployment, architecture, analytics, and security challenges.

To address some of these challenges, the inventors hereof have developed a number of systems and methods that have directly applicable to many IoT environments, deployments, and implementations. Each of these systems and methods may be categorized within one or more of the following areas: Acquisition, Transport, Aggregation, Analysis, and Control.

Acquisition encompasses the hardware—the IoT devices—that capture data from interactions with the environment, with other machines, with humans or other living things and make it available for transmission over a network. Sensors are the nerve ends of IoT, and a growing assortment of devices are collecting data. There are cases where historical data may be analyzed to provide business practice improvements (not all data needs to originate from sensors).

Transport takes the acquired data from various sensors and moves it over a network for aggregation and analysis. As the name implies, the final stages of data transport generally flow over communication protocols (e.g., TCP/IP and others referred to below), and may be transformed into Internet friendly data formats like JSON or XML.

Aggregation is responsible for the collection and distribution of output data to designated consumers. Consumers can include databases, on-site services, analytics services, enterprise service buses, third-party cloud services and similar repositories.

Analysis takes the aggregated data and turns it into operational insights by applying context specific algorithms, rules, and predictive models. In most deployments, IoT analytics may include feedback capabilities so that the predictive models get better over time. In some cases, analytics may be run in the cloud or on the edge such as on an IoT gateway device.

Control provides the ability to act based upon insights gleaned from the analysis of IoT data. Different types of control actions available may range from graphical representation to humans, who can then take manual actions, to fully autonomous systems that can take orchestrated actions to improve operations, recognize and mitigate failures and threats, and prevent hazards.

For example, consider a relatively simple use case of environmental monitoring of an office building. Assume, that there are sensors installed throughout the building to monitor temperature and carbon monoxide levels; this is part of the aforementioned data aggregation component of IoT. As part of the transport component, there are many technology protocols that may be used to transport the collected data, including BACnet (Building and Automation Control networks), Zigbee, Bluetooth Low Energy, Wi-Fi, and others, which may use IoT gateway(s) to translate the sensors' data or communications to a cloud or remote backend server.

From the gateway(s), data is communicated through an aggregation layer as part of the aggregation component. The aggregated data reaches a cloud based analysis engine that enables the system to responds to changes in the monitored environment. For instance, such a system may be used to enforce a rule such that, if a room temperature gets too hot, a command is issued to turn up the A/C.

Overlaying each of these components are techniques related to security, data governance, and systems management of the IoT infrastructure.

To illustrate an example of an IoT environment where the systems and methods described herein may be implemented, FIG. 1 shows IoT deployment 100 according to some embodiments. Particularly, deployment 100 includes IoT device(s) 101, such as building automation and data devices, surveillance devices, HVAC devices, smart metering and sub-metering, lighting devices, etc., which provide and receive data of a network using one or more communication protocols 102, such as Ethernet, BACnet (Building Automation and Control), Controller Area Network (CAN bus), Modbus, Zigbee, Bluetooth, Wi-Fi, RFID, etc.

Using protocol(s) 102, IoT devices 101 communicate with IoT gateway(s) 103. In several implementations, IoT gateway(s) 103 may include services such as protocol translation 104A, device management 104B, data aggregation 104C, and edge analytics 104N. In many cases, elements 101-103 may be disposed or employed in the same premises (e.g., a building, a home, a vehicle, etc.) and/or may be owned by (or licensed to) the same entity or consumer.

In many implementations, however, gateway(s) 103 may also be in communication with cloud or remote server(s) 105, which can then provide services such as IT system data integration 106A, big data analytics 106B, and visualization and reporting 106N. For example, cloud or remote server(s) may be provided or operated by a third-party remotely located with respect to the premises where the IoT device(s) 101 and gateway(s) 103 are deployed.

Here it should be emphasized that IoT deployment 100 is depicted for sake of illustration only. There are virtually infinite different configurations possible in any given IoT deployment. In fact, it is often desirable that a given IoT installation remain flexible, so that new and different IoT devices, gateways, switches, access points, servers, services, etc. may be added, removed, or replaced, as the IoT network evolves over time. Although the techniques discussed herein are immediately applicable to the example IoT deployment 100 of FIG. 1, it is understood that the same techniques may be equally application to any IoT environment.

B. Hardware

In some embodiments, one or more of gateway(s) 103, server(s) 105, and/or IoT devices 101 shown in FIG. 1 may be implemented as an Information Handling System (IHS). For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes.

For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of NVMs.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
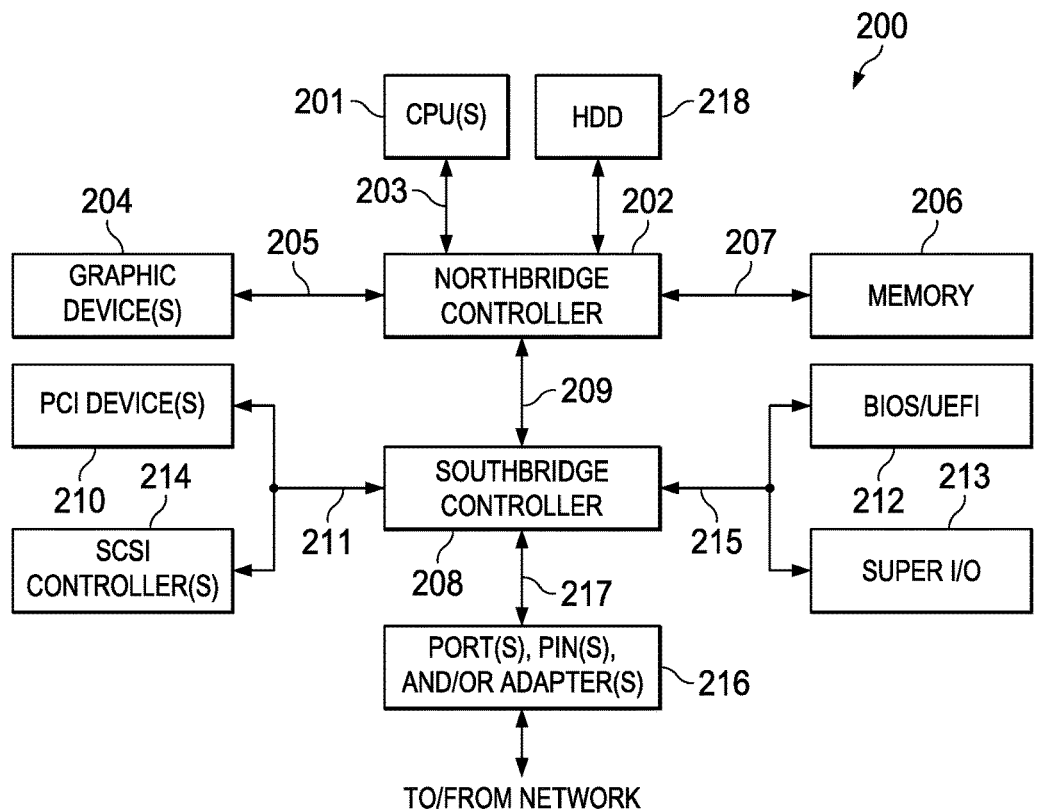
FIG. 2 illustrates an example of an Information Handling System (IHS) implementation according to some embodiments.

FIG. 2 is a block diagram of an example of an IHS. Although IHS 200 may be used to build any component shown in FIG. 1, it is particularly applicable to implementations of IoT gateway(s) 103. In some situations, an IoT gateway can have additional compute added if edge analytics are needed on the gateway at the network edge, as opposed to being distributed in the cloud/backend server.

As shown, IHS 200 includes one or more CPUs 201. In various embodiments, IHS 200 may be a single-processor system including one CPU 201, or a multi-processor system including two or more CPU(s) 201 (e.g., two, four, eight, or any other suitable number). CPU(s) 201 may include any processor capable of executing program instructions. For example, in various embodiments, CPU(s) 201 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 201 may commonly, but not necessarily, implement the same ISA.

In some cases, one or more of CPU(s) 201 may include a Graphics Processing Unit (GPU), field programmable gate array (FPGA), or other suitable integrated component that is specifically used to perform analytics (e.g., machine learning).

CPU(s) 201 are coupled to northbridge controller or chipset 202 via front-side bus 203. Northbridge controller 202 may be configured to coordinate I/O traffic between CPU(s) 201 and other components. For example, in this particular implementation, northbridge controller 202 is coupled to graphics device(s) 204 (e.g., one or more video cards or adaptors) via graphics bus 205 (e.g., an Accelerated Graphics Port or AGP bus, a Peripheral Component Interconnect or PCI bus, or the like).

Northbridge controller 202 is also coupled to system memory 206 via memory bus 207, and to hard disk drive (HDD) 218. Memory 206 may be configured to store program instructions and/or data accessible by CPU(s) 201. In various embodiments, memory 206 may be implemented using any suitable memory technology, such as static RAM (SRAM), synchronous dynamic RAM (SDRAM), nonvolatile/Flash-type memory, or any other type of memory. Conversely, HDD 218 may include any magnetic, solid-state (SSD), or hybrid data storage device capable of storing an OS and other applications.

In operation, CPU(s) 201 execute program instructions that are stored in memory 206 and/or HDD 218. Under control of those instructions, IHS 200 may be configured to provide a number or services described in more detail below.

Northbridge controller 202 is coupled to southbridge controller or chipset 208 via internal bus 209. Generally speaking, southbridge controller 208 may be configured to handle various of IHS 200's I/O operations, and it may provide interfaces such as, for instance, Universal Serial Bus (USB), audio, serial (e.g., RS232, RS485, CANbus, RS422, etc.), parallel, Ethernet, or the like via port(s), pin(s) (e.g. GPIO or General-Purpose Input Output), and/or adapter(s) 216 over bus 217.

For example, southbridge controller 208 may be configured to allow data to be exchanged between IHS 200 and other devices, such as other IHSs attached to a network (e.g., network 101). In various embodiments, southbridge controller 208 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 208 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 208 is further coupled to one or more PCI devices 210 (e.g., modems, network cards, sound cards, or video cards) and to one or more SCSI controllers 214 via parallel bus 211.

Southbridge controller 208 is also coupled to BIOS/UEFI 212 and to Super I/O Controller 213 via Low Pin Count (LPC) bus 215. BIOS/UEFI 212 includes non-volatile memory having program instructions stored thereon. Those instructions may be usable by CPU(s) 201 to initialize and test other hardware components and/or to load an Operating System (OS) onto IHS 200. Super I/O Controller 213 combines interfaces for a variety of lower bandwidth or low data rate devices. Those devices may include, for example, floppy disks, parallel ports, keyboard and mouse, temperature sensor and fan speed monitoring/control, among others.

In various implementations, southbridge controller 208 may be configured to allow data to be exchanged between BIOS/UEFI 212 and another IHS attached to a network (e.g., a remote server or other source of technical service) using wired or wireless capabilities of network adapter 216.

In some cases, IHS 200 may be configured to provide access to different types of computer-accessible media separate from memory 206. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 202 and/or southbridge controller 208.

The terms "physical," "hardware," "tangible," and "non-transitory," when used in the context of computer-readable storage or memories, are intended to describe devices excluding propagating electromagnetic signals; but are not intended to otherwise limit the type of physical storage device. For instance, the aforementioned terms are intended to encompass types of hardware, physical storage devices that do not necessarily store information permanently, including, for example, RAM. Program instructions and data stored on a physical memory device in non-transitory form may afterwards be transmitted by transmission media or signals such as electrical, electromagnetic, or digital signals, as a separate or independent process, which may then be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 202 may be combined with southbridge controller 208, and/or be at least partially incorporated into CPU(s) 201. In other implementations, one or more of the devices or components shown in FIG. 2 may be absent, or one or more other components may be present. For instance, in some cases, IHS 200 may include a Trusted Platform Module (TPM) or secure cryptoprocessor, not shown in FIG. 2 for sake of simplicity. But it should be readily understood that the systems and methods described herein may be implemented or executed with other IHS configurations.

In various embodiments, IHS 200 may be contained within a chassis, case, or other enclosure. And, in many applications, such a chassis may have an industrial or rugged design that can be fan-less, operate within a temperature range (e.g., −10° C.-70° C.), support multiple power supplies and/or wireless antennas, etc.

Figure 3:
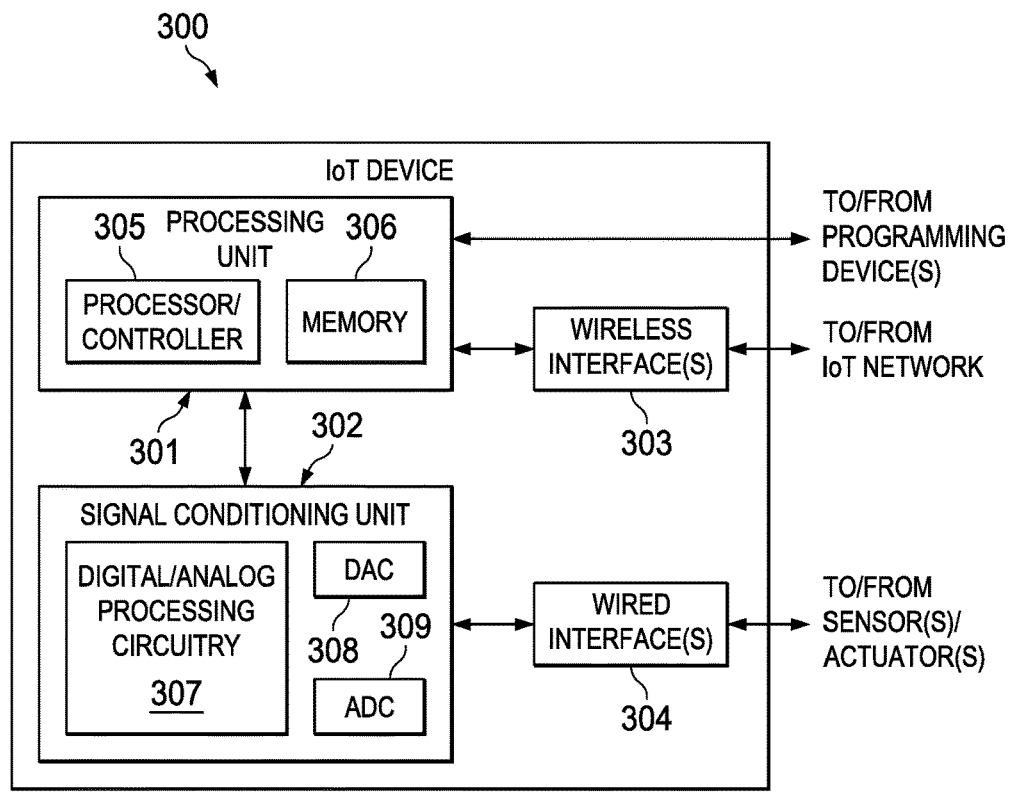
FIG. 3 illustrates an example of an IoT device implementation according to some embodiments.

Referring now to FIG. 3, any given one of IoT devices 101 of FIG. 1 may be implemented as device 300. It should be noted, however, that IoT device architectures typically vary widely from device to device. Generally speaking, IoT devices range from legacy sensors and actuators (e.g., interfaced via adaptors, hubs, or other circuitry that provides network connectivity) to sophisticated embedded devices and IHSs, such as IHS 200 of FIG. 2.

Therefore, although device 300 is likely to be found in a modern IoT environment, it should also be kept in mind that the various components of device 300 are discussed for sake of illustration only. It should be readily understood, however, that certain systems and methods described herein may be implemented or executed with other IoT device configurations.

Referring back to FIG. 3, IoT device 300 includes processing unit 301, signal conditioning unit 302, wireless interface 303, and wired interface 304. Processing unit 301 includes processor or controller 305 and memory 306. Signal conditioning unit 302 includes digital/analog processing circuitry 307, digital-to-analog converter (DAC) 308, and analog-to-digital converter (ADC) 309.

Wireless interface 303 may include any hardware, circuitry, and/or software that enables IoT device 300 to receive and/or transmit data over a wireless medium. Examples of wireless networks include, but are not limited to, Wi-Fi, Bluetooth, BLE, ZigBee, Z-wave, 6LoWPAN, Thread, Sigfox, LoRA, WirelessHD, WiGig, HaLow, NFC, RFID, SigFox LoRaWAN, Ingenu, Weightless, ANT, DigiMesh, MiWi EnOcean, Dash7, or WirelessHART networks, cellular networks (e.g., second generation (2G), third generation (3G), fourth generation (4G), a Long Term Evolution (LTE), a fifth generation (5G) network), and satellite networks. Typically, wireless interface(s) 303 are used to communicate data between IoT devices, IoT gateways, backend servers, etc. ("to/from IoT network").

Wired interface 304 may include any hardware, circuitry, and/or software that enables IoT device 300 to receive and/or transmit data over a wired medium. Examples of wired networks include Ethernet, cable, optical fiber, USB, HDMI, DSL, PowerLine, HomePlug, HomePNA, X10, and Public Switched Telephone Networks (PSTN). Similarly as above, wired interface(s) 304 may also be used to communicate data over an IoT network.

Additionally or alternatively, wired interface 304 may include circuitry configured to receive and transmit digital signals or data such as, for example, RS232, RS485, CANbus, RS422, USB, video signals (e.g., to and from a monitor or camera), and GPIO. Additionally or alternatively, wired interface 304 may be used to transmit and receive analog signals usable to indicate and/or to control the status of buttons, switches, contactors, actuators, etc. ("to/from sensor(s)/actuator(s)").

Processor or controller 305 and memory 306 operate similarly as CPU(s) 201 and memories 206 and 218 of IHS 200. That is, processor 305 executes program instructions that are either stored in the processor itself or in memory 306. Under control of those instructions, IoT device 300 may be configured to provide a number or services described in more detail below. In some cases, a programming device may provide such instructions to processor/controller 305 using a dedicated PLC interface or the like ("to/from programming device(s)").

Digital/analog processing circuitry 307 may include any digital or analog circuitry configured condition input or output signals that are received or transmitted by IoT device 300, particularly through wired interface(s) 304. For example, analog signals may be transmitted using DAC circuitry 308 and received using ADC circuitry 309. Accordingly, processing circuitry 307 may include any signal processing circuit (DSP), filter, amplifier, mixer, integrator, limiter, oscillator, impedance, rectifier, etc. In some cases, digital/analog processing circuitry 307 may be integrated into processor/controller 305.

It should be noted that, it many applications, any hardware equipment used to interconnect any component in an IoT network may itself be an IoT device (e.g., a wireless access point, a network switch, a legacy sensor hub or aggregator, etc.). Additionally or alternatively, in many applications, otherwise conventional IHS devices, such as, for example, computers, desktops, smart phones, tablets, etc., may also operate as IoT devices.

C. Services

Figure 4:
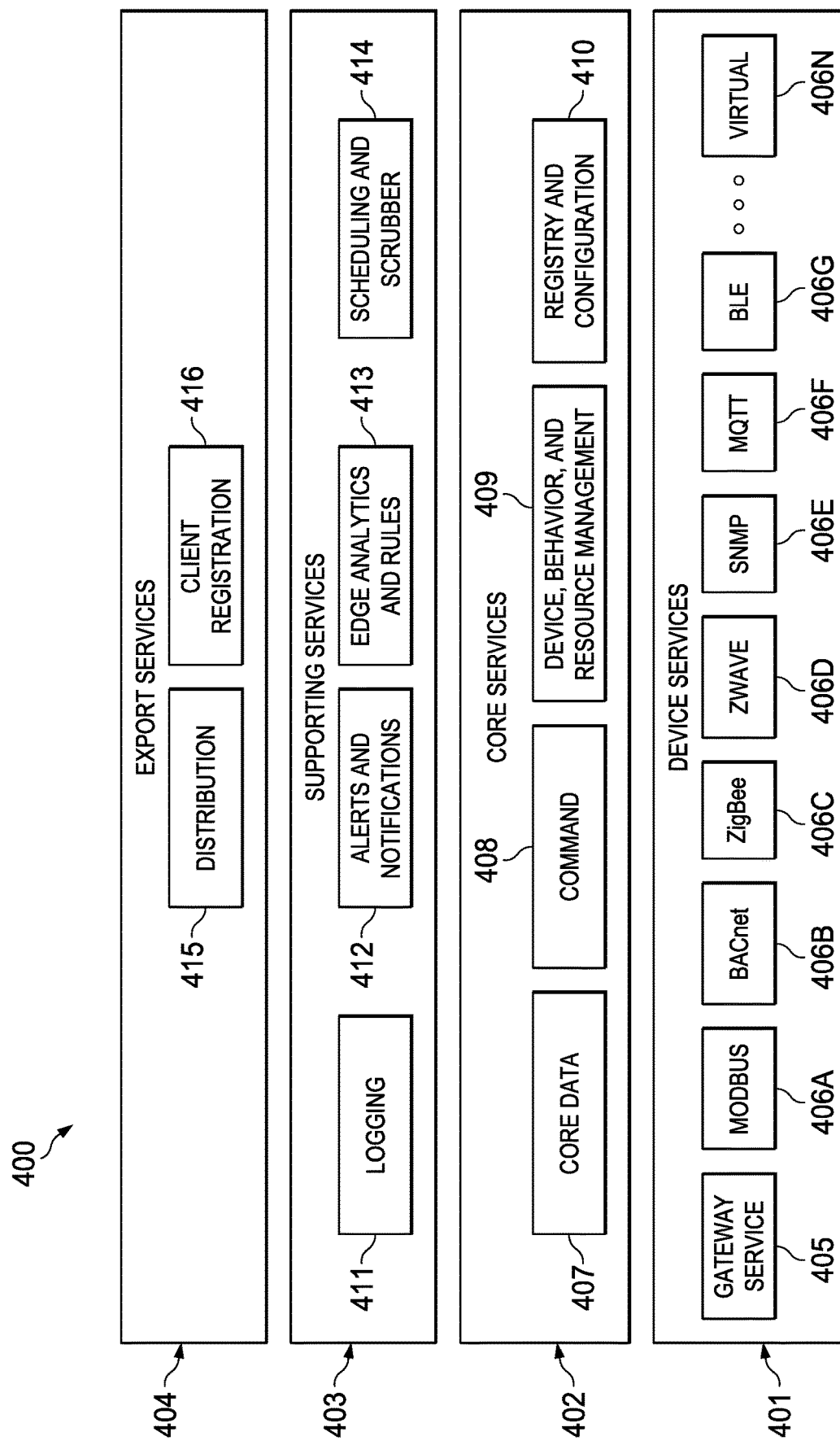
FIG. 4 illustrates examples of IoT services according to some embodiments.

FIG. 4 illustrates examples of IoT services. In various embodiments, services 400 may be provided and/or enabled via execution of program instructions by CPU(s) 201 of IHS 200 (FIG. 2) implementing any given one of IoT gateway(s) 103 (FIG. 1). In this particular implementation, services 400 include device services 401, core services 402, supporting services 403, and export services 404.

Device services 401 enable IoT gateway(s) 103 to transmit and receive data to and from IoT devices 101 and/or other IoT gateway(s) 103 over wireless and/or wired interfaces 303 and 304, respectively. In this embodiment, device services 401 include the following modules or microservices: gateway service 405 (Peer-to-Peer or P2P), Modbus service 406A, BACnet service 406B, ZigBee service 406C, Zwave service 406D, SNMP service 406E, MQTT service 406F, BLE service 406G, and virtual service 406N (for virtual IoT devices). It should be noted, however, that in other embodiments, device services 401 may include other modules or microservices configured to enable IoT gateway(s) 103 to perform operations described herein, including, for example, communicating with any device in the IoT network using a suitable communication protocol.

Core services 402 enable IoT gateway(s) 103 to receive and store data in memory, to issue commands to IoT devices using device services 401, to manage metadata and provisioning of IoT devices, as well as IoT device registration and configuration. In this embodiment, core services 402 include the following modules or microservices: core data service 407; command service 408; device, behavior, and resource management service 409; and registry and configuration service 410. It should be noted, however, that in other embodiments, core services 402 may include other modules or microservices configured to enable IoT gateway(s) 103 to perform operations described herein.

Supporting services 403 enable IoT gateway(s) 103 to log events generate alerts and notification, and to apply rules, as well as scheduling, and scrubbing. In this embodiment, export services 404 include the following modules or microservices: distribution 415 and client registration module 416. It should be noted, however, that in other embodiments, supporting services 403 may include other modules or microservices configured to enable IoT gateway(s) 103 to perform operations described herein.

Export services 404 enable IoT gateway(s) 103 to distribute data to other IoT gateway(s) 103 and/or server 105, as well as to perform client registration operations. In this embodiment, export services 404 include the following modules or microservices: distribution 415 and client registration 416. It should be noted, however, that in other embodiments, export services 404 may include other modules or microservices configured to enable IoT gateway(s) 103 to perform operations described herein.

In various embodiments, any given one of microservices 405-416 may be provided in the form of program instructions executable by CPU(s) 201. In some cases, all of microservices 405-416 are written in the same programming language. In other cases, however, different microservices may be written in different languages. Examples of suitable programming languages include, but are not limited to: Java, C, Javascript, C++, Python, Node.js, PHP, Lua., Assembler, Go, SWIFT, Rust, Parasail, B #, Ruby, Haskell, erlang, scala, R, etc.

In operation, microservices 405-416 may communicate with each other any suitable communication protocol. For example, in some cases, inter-service communications may use RESTful interfaces. In other embodiments, however, communications may be supported by other protocols such as ZeroMQ (OMQ), MQTT, AMPQ, SNMP, DDS, or the like.

D. Example Applications

In some embodiments, a variety of IoT techniques may be implemented, at least in part, by one or more gateway(s) 103 configured with one or more of services 400. Examples of these applications are discussed in turn below.

i. Gateway Classification

In some embodiments, cluster analysis may be used to classify large, heterogeneous system installations using enterprise server and client system configuration information. A problem with IoT gateways is that, by itself, the gateway lacks a way to differentiate itself by its internals. IoT devices connected to an IoT gateway are key ingredients in that gateway's classification. While a large deployment may use one gateway model for one type of usage model, it is much more common to have a large installation of the same gateway model with widely varying usage models.

Accordingly, techniques may be used for gathering aggregate classification data for important variables, such as IoT devices connected to the gateway and how they are used. Looking across multiple gateways, across multiple sites and geographies, an administrator can employ this classification method in order to understand the topography of their IoT landscape.

IoT gateways provide data aggregation and analysis across disparate end points. These end points vary in their connection type and their typical data access patterns. It is valuable to administrators of IoT Gateway networks to classify gateways by way of their end points, connection types, and data access patterns in order to provide more descriptive topology. In some embodiments, edge analytics and rules microservice 409 may be used to implement these techniques.

Classification may begin by gathering data across a large sample set of the population of IoT gateways, including their end points connected and summaries of each end points utilization rates and data access patterns. These factors are then incorporated into a cluster analysis, such as a K-Means (Least Sum of Squares) algorithm or the like, to produce some number of clusters.

Cluster models may vary in the number of clusters produced and these models compared and contrasted to identify which are supported by a priori knowledge of the market. With these new insights, products and solutions may be offered which target the densest regions of the cluster analysis with optimized solutions that deliver the best performance and reliability within the primary predictor variables such as the type of end points connected and their data access patterns.

In some cases, analysis of gateway end point connectivity and access patterns allow them to be classified into use case clusters. Additionally or alternatively, identification of cluster centers may describe a subset of gateways based on end point device connectivity and utilization. Additionally or alternatively, trends in connectivity and utilization across gateways may be analyzed over time as usages split, merge, and evolve.

ii. Device Profiles

IoT is more fragmented than ever before. Many IoT devices or sensors that are manufactured today operate with a number of different communication protocols. As a result, interoperability within a system that includes sensors from different manufacturers operating on multiple protocols is difficult. It is extremely challenging to mine the data into a common framework for intelligent analysis and decision making.

And it is impossible to automate a system to command and control a sensor based on a condition occurring in another system. For example, if a system detects extreme temperatures of a car engine (e.g., (−30 C to 70 C) it has to slow down the RPM of the motor). If the temperature sensor and engine are operating under different protocols from different manufacturers, it is impossible for a system to detect this condition and execute the remedy if both the devices are not operating within the same operating framework.

Accordingly, in some embodiments, systems and methods provided herein describe an IoT device (e.g., a sensor) in data format. In some embodiments, device, behavior, and resource management service 409 may be used to implement these techniques. The description of the device may enable methods of retrieving data from the device and methods to command and control the device. Such a description may abstract any implementation complexity of any device that communicates over any protocol.

In some cases, firmware on a gateway may detect a hot-plug event, walk address spaces, probe the newly plugged IoT device, and download a device profile from the cloud.

Some implementations may involve the pre-provisioning of IoT devices on the gateway by inspecting the device to determine its identity and state, and then taking steps to configure the device with a known set of default values prior to registering it with a broader system. Pre-provisioning may enable features such as calibration of the sensor so that the gateway can reliably depend upon the type of information from IoT device (e.g., a pre-provisioning process switches a register on the sensor so that it only sends temperature in Fahrenheit when queried).

In other implementations, legacy devices may have a QR code printed on the sensor that can be used to pull the profile information of the sensor from the cloud as part of pre-provisioning. In yet other implementations, firmware may be included in the sensor that communicates with firmware of the gateway about the type and profile of the device which exposes the data to the application layer.

In some embodiments, a new sensor may be added to a software framework running on a gateway without disturbing the existing configuration on the gateway and without restarting any service. In other embodiments, firmware on the gateway may be configured to understand the descriptive language provided by the operator and to start acting upon the device and soon as it is provisioned on the gateway. The firmware may indicate with a signal (e.g., blinking LED or sending SMS/email) when a new sensor is provisioned on the gateway. In yet other embodiments, firmware on the gateway when the operator wants to mine the data from sensors from different manufacturers or protocols.

In some cases, data from all sensors collected at the firmware level may be similar to each other and all of them may be operated at the highest level without any knowledge of the protocol or the system they are operating in.

In sum, systems and methods described herein may abstract the device protocol from user, for example, by using a provisioning service to get connection information from sensor directly, describing a device to the framework which is running on the gateway, providing a common command and control different devices operating on different protocols, and/or creating a homogenous representation of sensors operating on multiple protocols from different manufacturers.

iii. Device Identity

Protecting deployed infrastructure in an IoT environment can be difficult, particularly when dealing with legacy devices and sensors. Due to their age, legacy devices provide little if any protection against tamper, spoofing, data injection, or other malicious behavior that an attacker may undertake. Newer devices may provide some provisions for security but these are often neither comprehensive nor foolproof without careful orchestration and deployment. Without proper safeguards, there is the potential for compromise of sensitive information, destruction of property, and other material loss.

In some cases, systems and methods described herein may augment or enhance the identity of a device by measuring various hardware and software based interactions with it and tracking them over time to establish a pattern of device characteristics and behavior. Once the behavioral pattern is established, then deviations from that pattern may be detected and preventive and corrective actions taken to protect against malicious behavior. In some embodiments, device, behavior, and resource management service 409 may be used to implement these techniques.

Additionally or alternatively, anomalous behaviors may be detected across a group of homogenous sensors—e.g., one behaving unusually relative to others. Additionally or alternatively, anomalous behavior may be detected across a set of heterogeneous devices—e.g., device is thought to be offline but is registering unusual current/voltage on an associated power meter. Given that these measurements and their assessment may only be known to the system, this makes it difficult for an attacker to know what is being measured. Moreover, a system may change these factors at any time, increasing tampering difficulty.

In various embodiments, measured items may include, but are not limited to: latency of request/responses, frequency of indications, consistency of content in responses as compared to expected content, correlations among measurements related to the device, from the device itself and other devices, electrical voltage, electrical current, and/or electrical impedance on physical connections during communications, bit error rates, SNR, etc., changes in boot times, initial connection times, noise on a connection during idle periods, and environmental factors, such as distance relative to signal strength.

As such, systems and methods described herein may collect hardware and/or software metrics associated with a device, characterize, augment and establish device identity using collected metrics, perform analysis of collected metrics against established device identity metrics, detect anomalous metrics, take actions based upon detection, and/or allow for reestablishment of identity due to changes in environment, device composition, or other factors.

iv. Overload Prevention

In some embodiments, systems and methods described herein may perform overload prevention. An overload prevention routine within device, behavior, and resource management service 409 may be used to manage gateway resources by making decisions based on multiple data sources. A resource usage anomaly may cause the overload prevention module to take steps to prevent anomalous or excessive traffic from entering the system and configure the gateway to work around the affected services or interfaces. The device, behavior, and resource management service 409 may also be used as a system management capability as a failsafe way to silence a rogue gateway or managed device.

In some implementations, device, behavior, and resource management service 409 may detect anomalous levels of resource consumption by a service or on an interface compared to an ongoing baseline. To preserve functionality, the device, behavior, and resource management service 409 may reconfigure the affected service or communication medium based on current and historical data. This action may include postponing low priority actions, reducing collection rate, volume, devices served, stopping services, and disabling interfaces. The overload prevention routine may use a blend of operator priority specifications and data characteristics to intelligently preserve as much system functionality as possible, including rerouting communication through other interfaces.

In sum, systems and methods described herein may, using resource consumption, device configuration, dynamic data volatility metrics, and service configuration, balance microservices and communications interfaces to protect against attacks and erroneous states by intelligently degrading capability. These system and methods may also use content and context-aware methods to determine which progressively more aggressive mitigations options to take.

v. Safeguard and Recovery

IoT Gateways aggregate data collected by managed IoT devices. In some cases, such data may contain information about power anomalies likely to affect managed devices immediately or in the near future. Accordingly, in some systems and methods described herein, the gateway may take action to preserve system health. In some embodiments, device, behavior, and resource management service 409 may be used to implement these techniques.

For example, the gateway may sense an incoming power/environmental anomaly (e.g., weather, voltage, current, or phase), and it may take action to preserve the system. Gateway actions may include, but are not limited to: graceful shutdown of managed devices, reduction in collection and reporting rate and fields, reduction in running services, reduction in system hardware usage (e.g., drop CPU frequency, etc.), drive parking, handing sensors off to unaffected gateways or routes (e.g., when gateway knows that it or other infrastructure will go down), priority-based device shutdown in limited resource pool, sending indication to home, notifying to throttle external communication attempts, etc.

The gateway may also prime itself and devices for post-power restore. Actions may include, but are not limited to: seeding startup timers to prevent all devices from requesting connection at the same time and/or rediscovery behaviors include prioritization of restart and reconnection of devices.

In some embodiments, device configuration, dynamic data volatility metrics, and service configuration may react to power anomalies by intelligently degrading capability. Content and context-aware techniques may be used to determine which progressively more aggressive mitigations options to take. Moreover, the same metrics may be used to cause the process to restart in order to prioritize the most critical devices and data.

vi. Load Balancing

Today enterprise servers use task scheduling, reprioritization, and load balancing to maintain an optimal internal state despite wildly varying environmental and traffic conditions. This can be done by evaluating the incoming requests, comparing with current utilization and saturation rates, and determining whether priorities can still be maintained (such as serving dynamic web content) while resources are heavily utilized for other tasks (such as database requests). A server may opt to reschedule or reprioritize tasks, or completely reassign request(s) to another node on the network in order to maintain its own set of priorities.

IoT gateways are challenged in implementing similar methods to maintain an optimal internal state because, among other things, they aggregate data across a broad and heterogeneous set of IoT devices (e.g., edge devices, such as an airflow sensor, video camera, or a door lock). Also, IoT gateways serve a wide variety of purposes, and often their purpose is determined by the devices to which they connect. Moreover, IoT gateways are constrained in performance by a number of internal factors such as power, thermals, and available bandwidth to end points.

In various embodiments, techniques are presented for optimizing IoT gateway performance based on utilization and saturation rates, as well as other factors, of not only the internal components of the gateway (such as the CPU) but also of external devices connected to disparate bus architectures. In many cases, these techniques may provide ability to automatically adjust the workloads of every IoT gateway in the installation to maintain optimal internal states. In some embodiments, device, behavior, and resource management service 409 may be used to implement these techniques.

IoT gateways are constrained in performance by a number of internal factors such as power, thermals, and available bandwidth to end points. By analyzing end point access patterns and establishing correlation between predictor variables (e.g., log reads and writes, alerts, errors, and similar) and responses (e.g., CPU temperature and power consumption), performance can be optimized and long-term reliability improved through task rescheduling, reprioritization, and/or load rebalancing to other gateways on the network.

In some embodiments, techniques described herein may gather several or all possible predictor variables (e.g., internal instrumentation data within the gateway, connected devices, telemetry data for end points, end point traffic classes, etc.), identify desired and avoidable conditions (e.g., running average power targets, running average temperature, etc.), identify subset of predictors that explain variations in the target conditions (e.g., via artificial neural network), construct a model that describes the relationship between predictor and response, and/or monitor predictors and alter gateway workloads steering toward desirable states and away from undesirable states.

As such, techniques described herein may enable identification of suitable times to analyze instrumentation logs to identify opportunities to optimize performance and/or reliability, analyze gateway end point access patterns to determine subset of predictor variables correlating to a targeted (e.g., desirable or avoidable) response, and/or perform task rescheduling, reprioritization, and/or load rebalancing to other gateways on the network.

vii. Smart Lock

IoT gateways are often deployed in "headless" configurations and depending on its use case often in remote deployments that are potentially in various locations inside, outside of buildings, etc. In some cases, IoT gateway manufacturers may provide a rugged enclosure chassis for installing gateways in harsher or environments needing more security and protection. Moreover, support may be built-in for intrusion detection which can be reported/alerted to the gateway's management system.

An IoT gateway's chassis, as described herein, may provide not just physical gateway security and intrusion detection/reporting, but it may also prevent an unauthorized person from tampering, updating and using, or potentially hijacking the gateway for other purposes. For example, if an unauthorized user has physical access to the machine, then there is no security. Once the rugged enclosure is breached, anyone with physical access to the device can press the power button, plug devices into USB, serial, and HDMI/video ports, and thereby use, change, configure, or highjack the box. In some embodiments, device, behavior, and resource management service 409 may be used to implement these techniques.

In some embodiments, systems and methods described herein may provide an additional smart locking capabilities to the gateway; a cyber factor in addition to conventional intrusion detection. The gateway knows when it is locked physically using the rugged enclosure intrusion detection switch connected to the gateway. Using an OS level application, handler, or service (or in another embodiment a security microservice), the gateway may invoke a cyber lock when the intrusion system is closed/locked.

A cyber lock may additionally or alternatively disable external power button functionality, disable HDMI/video out ports, disable ability to add new USB, serial, I/O connections, and/or lock down gateway policy/configuration setup including networking setup.

Device, behavior, and resource management service 409 may be used to monitor hardware intrusion detection (e.g., other embodiments include BIOS/UEFI modules, OS app/service, etc.). Upon enabling intrusion detection, the microservice may lock down a configured list—power button control, disabling HDMI/video out, disabling ability to add new USB, serial, or I/O connections, protects any further device configuration or device setup. Then, upon the intrusion detection switch being triggered, the microservice may report out an invalid intrusion alert to system management.

The device, behavior, and resource management service 409 may also provide secure remote unlocking by a technician to disable the intrusion detection for maintenance. This can additionally be provided by local sensing, such as using Bluetooth presence detection of a known key.

Accordingly, systems and methods described herein may provide the capability to further cyber lock down a device in addition to existing physical intrusion detection, thus helping prevent further access or damage to the gateway. These systems and methods may also facilitate the disablement of hardware power button and unused USB, serial, other I/O, and HDMI/video out ports upon intrusion detection.

E. Safeguarding and Recovering IoT Networks

Systems and methods described herein may safeguard and recover IoT devices and other components from power anomalies. Particularly, device, behavior, and resource management service 409 may be used to manage IoT devices in response to those anomalies. A power anomaly, when detected or forecast, may cause microservice 409 to perform one or more operations configured to preserve the IoT network.

In some embodiments, a power "anomaly" may be of at least one distinct type selected from the group consisting of: power failure (total loss of utility power), power sag (short term low voltage), power surge or "spike" (short term high voltage above 110% normal voltage), under-voltage or "brownout" (reduced line voltage for an extended period of a few minutes to a few days—e.g., during the summer months when most households and other energy consumers set their air conditioners higher than normal), over-voltage (extended period of increased line voltage for a few minutes up to a few days), electrical line noise (high frequency waveform caused by radio frequency interference (RFI) or electromagnetic interference (EMI)), frequency variation (change in frequency stability of 50 or 60 Hz), switching transient (instantaneous under-voltage), and harmonic distortion (distortion of a normal power wave, generally transmitted by nonlinear loads).

In some cases, one or more of the aforementioned types of power anomalies may affect only a subset of IoT devices among all devices in a given network. For example, a shielded sensor may be more immune to EMI that an unshielded sensor. Furthermore, within a given subset of IoT devices that is generally affected by a particular type of power anomaly, some devices may be more affected than others. For example, an IoT gateway may allow a particular IoT device to continue to operate despite an impending power outage (e.g., in full capacity or in reduced capacity, with fewer services) if that IoT device is battery powered, has access to alternative energy sources, has an Uninterruptible Power Supply (UPS), etc.

In some embodiments, each type of power anomaly may be associated with a subset of IoT devices and/or with an individual IoT device. In some cases, the degree to which a particular type of power anomaly is expected to affect an IoT device or a subset of IoT devices may be quantified as a binary value (e.g., "affected" or "not affected") or other suitable value (e.g., a scale from 1 to 5 with a smaller value meaning "less affected" and a larger value meaning "more affected").

Such quantifications may be obtained, for example, by analyzing the historical behavior of each IoT device when subject to a specific power anomaly. If an IoT device has a history of being sensitive to harmonic distortion, for instance, a value indicative of that sensitivity may be saved in a database or other instrumentation information stored in the IoT gateway (or accessible in the cloud).

In some embodiments, the term "data volatility" (or simply "volatility") may include historic trends of a "data field" (e.g., a temperature value, speed value, communication or power status, etc.) communicated between an IoT device and the IoT gateway within a "packet" having a number of other "data fields." These historic trends may include, for example, a maximum, minimum, mean, mode, standard deviation and/or any combination thereof with respect to the corresponding data field's value(s), as established based upon historic values to create a "baseline."

In some cases, volatility information may also be provided in the form of a database, table, or any other suitable format. As such, each data field may be tracked as communications occur, as well as the data field's corresponding value, over time, to establish the baseline.

In some embodiments, "current volatility" may refer to metrics based upon current data trends—that is, data being collected at the present time—which may be compared with the data field's nominal state. As described in more detail below, a data field's current volatility may also be compared with the baseline in order to determine whether a power anomaly has affected or is likely to affect the source IoT device. In some cases, a given data field may increase in volatility above a first threshold, or may reduce in volatility below a second threshold, depending on the type of device, in response to or in anticipation of a power anomaly.

In order to preserve the IoT network, an IoT gateway may assign an individual "service priority" to each connection of each of the plurality of IoT devices, and may perform certain operations (e.g., graceful shutdown, etc.) based at least in part in those priorities. In some cases, service priorities may be requested by the IoT device's own instrumentation. Additionally or alternatively, service priorities may be assigned manually by a user or administrator, automatically by an identification algorithm performed by the IoT gateway, by physical location of the IoT device, by role of the IoT device within a network or IoT system, etc.

For example, the IoT gateway may be configured to preserve the IHS network in light of an impending power anomaly (or in response to one) by reconnecting and prioritizing communications among IoT devices and IoT gateway(s) based upon a set of service priorities.

In some embodiments, a combination of IoT device service priorities with an indication of the IoT device's sensitivity to a particular power anomaly (e.g., a weighted sum, etc.) may yield a "safeguard and recovery priority," which may be a value or metric that indicates which, among a plurality of IoT device(s), should be handled first, second, third and so, and how.

Figure 5:
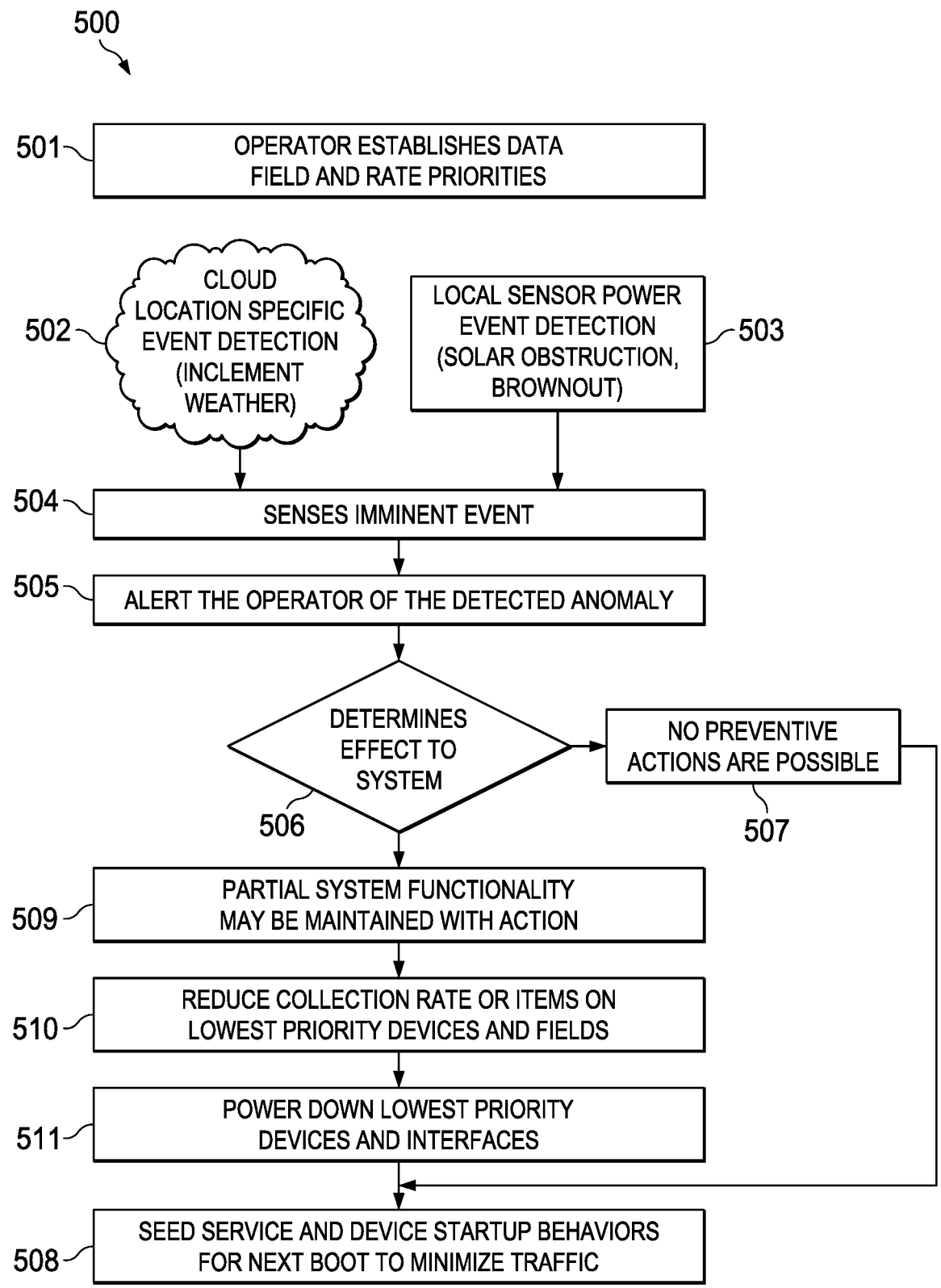
FIG. 5 illustrates an example of a method for safeguarding and recovering IoT devices from power anomalies according to some embodiments.

Referring to FIG. 5, an example of method 500 for safeguarding and recovering IoT devices from power anomalies is shown. In some embodiments, method 500 may be executed, at least in part, by device, behavior, and resource management service 409 provided within an IoT gateway.

At block 501, an operator selects a data field to be monitored and sets a priority value for each IoT device and/or interface and/or d communication channel between the IoT device and the IoT gateway. At block 502, the IoT gateway may receive cloud location-specific event detection, such as a power anomaly, based upon inclement weather or the like. The detection of block 502 may be performed by a sensor, detector, or other information source outside the portion of the IoT network managed by the IoT gateway. At block 503, the IoT gateway identifies detection of a local power event by a local sensor, that is, from an IoT device managed by the IoT gateway.

At block 504, the IoT gateway determines whether a particular type of power event has happened, is happening at the present time, or is likely to happen in the future based upon information from blocks 502 and/or 503. At block 505, the IoT gateway alerts the operator of the detected anomaly.

At block 506, the IoT gateway determines whether the power anomaly affects the IoT devices connected to it. If not, block 507 indicates that no preventive actions are needed or possible, and block 508 seeds service and device startup behaviors for next boot to minimize traffic. Otherwise, at block 509, partial system functionality may be maintained with preventive action; which may be selected based upon priority, volatility, an/or type of anomaly.

For example, at block 510, method 500 reduces a collection rate or items on lower priority devices, sensors, and/or data fields. At block 511, method 500 powers down lower priority devices and interfaces. Again, at block 508, method 500 seeds service and device startup behaviors of the next book to minimize traffic.

Examples of other responsive actions include at least one of: postponing selected operations (e.g., put or get requests, etc.), reducing the size of data fields to reduce the amount of data received by the IoT gateway, reducing a packet collection rate for packets received from one or more IoT devices (e.g., by instructing the IoT device to reduce a data acquisition rate of a sensor), re-routing and/or passing off IoT devices to other IoT gateways or interfaces, disabling IoT gateway supporting services, disabling IoT devices, disabling IoT device services, and/or disabling communication interfaces and re-routing traffic.

The examples described below illustrate various implementations of method 500. Numerous such examples and combinations will be apparent to a person of ordinary skill in the art in light of the various teachings described herein:

Example A provides an illustration of an application of method 500 to resolve a power anomaly based upon device shutdown. Assume, for example, that a first IoT gateway senses that there is insufficient power in the system. In this case, method 500 calculates priority levels of each IoT device based on the highest priority level of services dependent on that IoT device's data, powers down the lowest priority IoT device, if the device is amenable to being shut down, or the second lowest priority IoT device, and so on, until the power returns to normal operating conditions.

Example B provides an illustration of an application of method 500 to resolve an overload condition with device migration. Assume that a first IoT gateway determines that there is insufficient power in the system. Moreover, assume that the first IoT gateway also determines that no other mitigation, remedial, or responsive action is available to prevent the power loss. In this case, the first IoT gateway may migrate IoT devices to be unaffected by the power loss to a second, unaffected IoT gateway.

Example C provides an illustration of an application of method 500 to prepare a system for an impending power loss. Assume that a first IoT gateway determines that there is insufficient power in the system. Again, assume that the first IoT gateway also determines that no other mitigation, remedial, or responsive action is available to prevent the power loss. In this case, the first IoT gateway may configure an IoT device's initialization routines (and/or its own initialization routines) to require fewer requests, for example, by seeding timers and metadata to prevent service dependencies from creating unnecessary overhead when getting the system back online after power restoration.

In each of examples A-C, the process may be repeated until the resource overload condition is no longer detected. Moreover, in various embodiments, examples A-C may be combined in any suitable manner, such that overload conditions may be addressed using reduced collection volume, device migration, and/or capability degradation, whether in combination or independently of each other.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
one or more processors; and
a memory coupled to the one or more processors, the memory including program instructions stored thereon that, upon execution by the one or more processors, cause the IHS to:
detect an electrical power anomaly in an Internet-of-Things (IoT) network based, at least in part, upon a comparison between a current volatility of a data field and a volatility baseline for the data field, wherein the data field is part of a packet communicated between an IoT device and the IHS;
identify: (i) a sensitivity value of the IoT device with respect to the detected electrical power anomaly, wherein the sensitivity value is a binary value that indicates whether the detected electrical power anomaly is expected to affect the IoT device, and (ii) a priority value of the IoT device in the IoT network;
calculate a safeguard and recovery indicator as a weighted sum of the sensitivity value and the priority value; and
in response to the detection, manage the IoT network, at least in part, using the safeguard and recovery indicator of the IoT device.

2. The IHS of claim 1, wherein the electrical power anomaly is selected from the group consisting of: power failure, power sag, power surge, under-voltage, over-voltage, electrical line noise, electromagnetic interference, frequency variation, switching transient, and harmonic distortion.

3. The IHS of claim 1, wherein detecting the power anomaly includes forecasting the power anomaly in anticipation of the anomaly taking place.

4. The IHS of claim 1, wherein to manage the IoT network, the program instructions, upon execution, further cause the IHS to shut down one or more IoT devices based upon a priority value associated with the one or more IoT devices.

5. The IHS of claim 4, wherein the priority value is based, at least in part, upon at least one of: a physical location of the IoT device, or a role of the IoT device within the IoT network.

6. The IHS of claim 1, wherein to manage the IoT network, the program instructions, upon execution, further cause the IHS to instruct each of the one or more IoT devices to boot up in an order corresponding to the priority value.

7. The IHS of claim 1, wherein to manage the IoT network, the program instructions, upon execution, further cause the IHS to stop processing data received from one or more IoT devices.

8. The IHS of claim 1, wherein to manage the IoT network, the program instructions, upon execution, further cause the IHS to instruct the one or more IoT devices to reduce a data collection rate of one or more sensors.

9. The IHS of claim 8, wherein the one or more IoT devices include the IoT device, and wherein the IoT device includes a sensor that produces data included in the data field.

10. A hardware memory device having program instructions stored thereon that, upon execution by an Information Handling System (IHS), cause the IHS to:
detect an electrical power anomaly in an Internet-of-Things (IoT) network based, at least in part, upon a comparison between a current volatility of a data field and a volatility baseline for the data field, wherein the data field is part of a packet communicated between an IoT device and the IHS;
identify: (i) a sensitivity value of the IoT device with respect to the detected electrical power anomaly, wherein the sensitivity value is a scalar value that indicates a degree to which the detected electrical power anomaly is expected to affect the IoT device, and (ii) a priority value of the IoT device in the IoT network;
calculate a safeguard and recovery indicator as a weighted sum of the sensitivity value and the priority value; and
in response to the detection, manage the IoT network, at least in part, using the safeguard and recovery indicator of the IoT device.

11. The hardware memory device of claim 10, wherein the electrical power anomaly is selected from the group consisting of: power failure, power sag, power surge, under-voltage, over-voltage, electrical line noise, electromagnetic interference, frequency variation, switching transient, and harmonic distortion.

12. The hardware memory device of claim 10, wherein to manage the IoT network, the program instructions, upon execution, further cause the IHS to shut down one or more IoT devices based upon a priority value associated with the one or more IoT devices.

13. The hardware memory device of claim 12, wherein the priority value is based, at least in part, upon at least one of: a physical location of the IoT device, or a role of the IoT device within the IoT network.

14. The hardware memory device of claim 12, wherein to manage the IoT network, the program instructions, upon execution, further cause the IHS to instruct each of the one or more IoT devices to boot up in an order corresponding to the priority value.

15. The hardware memory device of claim 10, wherein to manage the IoT network, the program instructions, upon execution, further cause the IHS to stop processing data received from one or more IoT devices or to instruct the one or more IoT devices to reduce a data collection rate of one or more sensors.

16. A method, comprising:
detecting an electrical power anomaly in an Internet-of-Things (IoT) network based, at least in part, upon a comparison between a current volatility of a data field and a volatility baseline for the data field, wherein the data field is part of a packet communicated between an IoT device and the IHS;
identifying: (i) a sensitivity value of the IoT device with respect to the detected electrical power anomaly, wherein the sensitivity value is binary or a scalar value that indicates how much the detected electrical power anomaly is expected to affect the IoT device, and (ii) a priority value of the IoT device in the IoT network;
calculating a safeguard and recovery indicator as a weighted sum of the sensitivity value and the priority value; and
in response to the detection, managing the IoT network, at least in part, using the safeguard and recovery indicator of the IoT device.

17. The method of claim 16, wherein the electrical power anomaly is selected from the group consisting of: power failure, power sag, power surge, under-voltage, over-voltage, electrical line noise, electromagnetic interference, frequency variation, switching transient, and harmonic distortion.

18. The method of claim 16, wherein to manage the IoT network, the program instructions, upon execution, further cause the IHS to shut down one or more IoT devices based upon a priority value associated with the one or more IoT devices.

19. The method of claim 18, wherein the priority value is based, at least in part, upon at least one of: a physical location of the IoT device, or a role of the IoT device within the IoT network.

20. The method of claim 16, wherein to manage the IoT network, the program instructions, upon execution, further cause the IHS to stop processing data received from one or more IoT devices or to instruct the one or more IoT devices to reduce a data collection rate of one or more sensors.

\* \* \* \* \*